United States Patent Office 3,255,197
Patented June 7, 1966

3,255,197
CAMPHOR-PYRIDOXINE ORGANIC COMPOUNDS
Georges Kouchner, Fontenay-sous-Bois, France, assignor to Société Agroligique Francaise, Paris, France, a company of France
No Drawing. Filed Aug. 20, 1962, Ser. No. 218,163
Claims priority, application France, Aug. 21, 1961, 871,180; Nov. 16, 1961, 879,115
4 Claims. (Cl. 260—294.8)

The present invention relates to new compounds derived from camphor and pyridoxine and to a process for their production. It relates more particularly to the pyridoxine salts of camphoric, homocamphoric, camphosulfonic, camphocarboxylic, camphodithiocarboxylic and like acids and to their derivatives substituted by alkyl or halogen radicals.

The new compounds which form the subject of the invention have valuable pharmacological properties: they are cardiotonics, respiratory and vascular analeptics, which normalize the blood pressure and, in addition, have the properties of vitamin B6.

The invention relates to the salts of acids derived from camphor and of bases derived from pyridoxine, corresponding to the general formula:

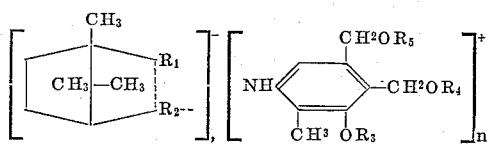

in which $n$ is a whole number equal to 1 or 2, $R_1$ and $R_2$ are radicals of the group comprising the radicals

—COO—, —S—COO—, —CH²—COO— and their derivatives as well as radicals of the form

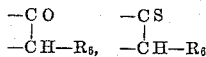

and their derivatives in which $R_1$ and $R_2$ are bonded to form an acid ring derived from camphor, $R_6$ being a radical of the group comprising the radicals —COO—, —SO³—, —SCOS—, —SCSO— and their derivatives; while $R_3$, $R_4$ and $R_5$ are radicals of the group comprising hydrogen, the halogens, the alkyl radicals and their derivatives and the metals and their derivatives.

The process for producing these salts, according to the invention, consists in causing a pyridoxine base to react in stoichiometrically proportional quantities, on the acid derived from camphor corresponding to the required salt, in solution in a neutral solvent such as water or ethanol, in evaporating the solution obtained, for example, over a water bath, and in causing the salt thus formed to crystallise.

In the process according to the invention, it is possible, to advantage, to use a pyridoxine base obtained by a process consisting in dissolving a halogenated pyridoxine salt, such as the hydrochloride, in a solution of an alkaline base, for example potassium hydroxide, in an organic solvent such as ethanol which is not a solvent for the alkali halide thus formed, in eliminating this halide by filtration and in extracting the pyridine base from the filtrate by crystallisation.

Following is a description by way of example of methods of carrying the invention into effect.

Example I

The pyridoxine base ($R_3=R_4=R_5=H$) is first prepared from pyridoxine hydrochloride: A solution of 104 g. of potash in 3 litres of denatured absolute alcohol is prepared and heated over a water bath. 315 g. of commercial pyridoxine hydrochloride are introduced progressively into this solution, with agitation. The pyridoxine hydrochloride dissolves and potassium chloride is formed which is insoluble in this solution while the pH of the mixture drops and becomes stabilized at about pH 7. Once the addition of pyridoxine hydrochloride is finished, filtration is effected to eliminate the potassium chloride and the clear solution is left to cool, the pyridoxine base crystallizing in its midst.

Then pyridoxine camphosulphonate is prepared: 169 g. (1 mol) of pyridoxine base, prepared as described above, are dissolved in two litres of absolute alcohol and 232 g. (1 mol) of camphosulphonic acid

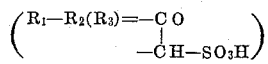

are added. A solution of about pH 3 is obtained which is filtered then evaporated under vacuum until it is the consistency of syrup. It is seeded with a crystal to cause the syrup to crystallise. The crystals are drained, washed in acetone and dried under vacuum. Thus 350 to 360 g. of pyridoxine camphosulphonate are obtained with a purity of 88%, sodium chloride representing the main impurity. The pyridoxine camphosulphonate obtained corresponds to the above general formula with $n=1$ and $$R_3=R_4=R_5=H$$

while $R_1$, $R_2$ and $R_3$ form the radical

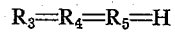
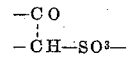

of the ring of the camphosulphonic acid.

Pyridoxine camphosulphonate with the emperical formula $C_{18}H_{27}O_7NS$, molecular weight=401.47, appears in the form of a white odourless powder with a bitter taste, melting at about 115–120° C. It is soluble in water with which it forms an acid solution of bromothymol blue pH. The pH of a 10% aqueous solution is about 3. It is slightly soluble in alcohols and practically insoluble in ether and solvents containing chlorine.

It can be identified by the following reactions:

In order to detect the carbonyl group of the camphosulphonate, 5 cc. of dinitrophenylhydrazine reagent (prepared as indicated in the Codex, 1949, page 1085) are added to 5 cc. of a 1% solution of pyridoxine camphosulphonate. It is brought to boiling and caused to boil for a few minutes. A characteristic orange red colouring develops with the deposition of crystals in fine needles on cooling.

In order to reveal the sulphur of the sulphonyl function, a check is first made to see whether the 1% solution of pyridoxine camphosulphonate to be analyzed does not produce a precipitate by means of barium chloride in a hydrochloric acid medium. If not, the camphosulphonate is purified by crystallisation before about 500 mg. thereof are introduced into a platinum dish with a few grains of potassium permanganate. Trituration is effected with 2 to 3 cc. of a 20% aqueous solution of soda before evaporation over a water bath. Calcining is then effected followed by absorption in 10% hydrochloric acid; hydrogen sulphide is released with a characteristic odour. The solution is filtered and produces a characteristic white precipitate with a solution of barium chloride.

In order to detect the pyridoxine, two 22 x 220 mm. test tubes are used into each of which is introduced 1 cc. of an aqueous solution of the camphosulphonate to be analyzed at 200 γ per cc., then 1 cc. of a mixture of 4 g. of ammonium chloride with 15 cc. of distilled water and 5 cc. of concentrated ammonia, then 1 cc. of an alcoholic solution comprising 0.55 cc. of 2,5-dichloroquinonechloromide and 5 cc. of distilled water. 1 cc. of a 5% solution of boric acid is added to one of the tubes which leads to a characteristic blue colouring developing into a greenish tint, while the control tube has no blue colouring.

In a decinormal solution of hydrochloric acid, the pure salt according to the invention has an ultraviolet absorption spectrum identical with that of the compounds of pyridoxine. At the maximum absorption (291 mμ) its coefficient of molecular extinction ($\epsilon$) is identical with that of the derivatives of pyridoxine ($\epsilon=9{,}150$). At this maximum absorption, with a slit 0.2 mm. wide, the specific coefficient of extinction $$E\,^{1\%}_{2\,cm.}$$

is equal to 227.

This property renders it possible to determine the pyridoxine camphosulphonate: 500 mg. of camphosulphonate are weighed to within a milligram, and introduced into a calibrated flask, the volume being brought up to 1 litre with a decinormal solution of hydrochloric acid. After agitation, 2 cc. of the solution thus obtained are taken and introduced into a calibrated flask and the volume is brought up to 100 cc. with a decinormal solution of hydrochloric acid. The same decinormal solution of hydrochloric acid is used as a control to calibrate an ultraviolet ray spectrograph with jars 1 cm. thick. The spectrum is adjusted between 220 and 320 mμ: the absorption is zero at 320 mμ, the spectrum has a minimum at about 250 mμ and a maximum at about 290–291 mμ. The optical density at 291 mμ of a pure solution of pyridoxine camphosulphonate at the rate of 1 mg. per 100 cc. is 0.227.

Administered by oral means in the form of grains or compressed tablets with 0.30 g. of active product corresponding to 0.10 g. of pyridoxine (from 1 to 6 per day on the average) or by parenteral means in the form of an injectable solution containing 5 to 10% of active product (from 1 to 10 cc. per day at the most). This pyridoxine camphosulphonate yields excellent results for sustaining treatment in the interval between major tonicardiac treatments or in association therewith. It is likewise useful for the treatment of hypotension, whether idiopathic or secondary to an infectious or other disease. It is also suitable for the treatment of collapse, of syncope, of lipothymy and more particularly for immediate post-anaesthetic and surgical treatment, as well as for recuperation, general debility and depression. It also relieves all the general indications of vitamin B6 thereby and helps in the treatment of disorders, particularly cardiac disorders, due to physical over-exertion.

*Example II*

Camphosulphonic acid and pyridoxine base are mixed in equimolecular quantities in neutral distilled water. The mixture is warmed to about 40° C. and evaporated over a gentle heat, preferably over a water bath. The pyridoxine camphosulphonate which is precipitated under these conditions is identical with that obtained by the process described in Example I.

Needless to say the invention is in no way limited to the examples described, it is open to numerous modifications available to one skilled in the art, according to the application envisaged and without therefore departing from the scope of the invention.

Thus camphoric acid ($R_1=R_2=COOH$) produces two salts with a pharmacodynamic activity similar to that of pyridoxine camphosulphonate: the neutral camphorate of pyridoxine ($n=2$, $R_1=R_2=-COO-$) and the acid camphorate of pyridoxine ($n=1$, $R_1=-COOH$ and $R_2=-COO-$ or $R_1=-COO-$ and $R_2=-COOH$). Likewise homocamphoric acid ($R_1=-COOH$, $R_2=-CH^2-COOH$) and dithiocamphoric acid ($R_1=R_2=-S-COOH$). In the case of these diacids, in order to obtain the acid salt, the acid and the pyridoxine base are caused to react in equimolecular quantities whereas, in order to obtain the neutral salt, two molecules of pyridoxine base are caused to react for one molecule of acid. On the other hand, only one single salt can be obtained by reaction in equimolecular quantities with the monoacids in which $R_1$ and $R_2$ contribute to the formation of a ring such as camphosulphonic acid

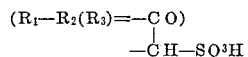

camphocarboxylic acid

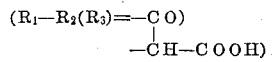

camphothiocarboxylic acid

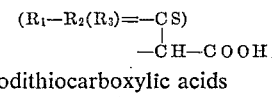

and the camphodithiocarboxylic acids

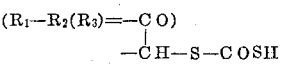

or

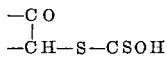

each of which likewise yields a salt endowed with pharmacodynamic properties similar to those of pyridoxine camphosulphonate.

I claim:

1. A salt of an acid selected from the group consisting of camphoric acid, homocamphoric acid, camphosulfonic acid, camphocarboxylic acid and camphodithiocarboxylic acid, and a base selected from the group consisting of pyridoxal, pyridoxamine and pyridoxine.
2. A salt of camphosulfonic acid and pyridoxine.
3. A salt of camphosulfonic acid and pyridoxamine.
4. A salt of camphosulfonic acid and pyridoxal.

References Cited by the Examiner

Noller, "Chemistry of Organic Compounds," 2nd ed., pp. 234–5, Saunders (1957).

WALTER A. MODANCE, *Primary Examiner.*

IRVING MARCUS, *Examiner.*